(12) United States Patent
Plotke (10) Patent No.: US 8,620,023 B1
(45) Date of Patent: Dec. 31, 2013

(54) OBJECT DETECTION AND LOCATION SYSTEM

(75) Inventor: Leonard A. Plotke, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/880,370

(22) Filed: Sep. 13, 2010

(51) Int. Cl.
*G06K 9/00* (2006.01)
(52) U.S. Cl.
USPC ........... 382/103; 382/104; 382/106; 348/143; 348/148; 348/149; 348/152; 348/157
(58) Field of Classification Search
None
See application file for complete search history.

(56) References Cited

U.S. PATENT DOCUMENTS

| | | | |
|---|---|---|---|
| 4,173,017 A | | 10/1979 | Burlage et al. |
| 4,253,670 A | | 3/1981 | Moulton et al. |
| 4,866,438 A | | 9/1989 | Knisch |
| 5,123,327 A | * | 6/1992 | Alston et al. ................. 89/1.813 |
| 5,734,337 A | | 3/1998 | Kupersmit |
| 5,735,497 A | * | 4/1998 | Haas et al. ................. 248/181.1 |
| 5,960,097 A | * | 9/1999 | Pfeiffer et al. ................. 382/103 |
| 6,205,231 B1 | | 3/2001 | Isadore-Barreca et al. |
| 6,222,492 B1 | | 4/2001 | Mahon |
| 6,266,442 B1 | * | 7/2001 | Laumeyer et al. ............. 382/190 |
| 6,363,161 B2 | * | 3/2002 | Laumeyer et al. ............. 382/104 |
| 6,449,384 B2 | * | 9/2002 | Laumeyer et al. ............. 382/104 |
| 7,552,008 B2 | * | 6/2009 | Newstrom et al. ............ 701/468 |
| 7,623,248 B2 | * | 11/2009 | Laflamme ..................... 356/601 |
| 8,160,452 B1 | | 4/2012 | Tidwell et al. |
| 8,294,595 B1 | | 10/2012 | Plotke |
| 8,395,665 B2 | * | 3/2013 | Otani et al. ................... 348/169 |
| 2001/0011957 A1 | | 8/2001 | Mitchell et al. |
| 2002/0106109 A1 | * | 8/2002 | Retterath et al. ............. 382/104 |
| 2002/0113872 A1 | * | 8/2002 | Kinjo ........................... 348/116 |
| 2002/0167445 A1 | | 11/2002 | Eden |
| 2005/0119030 A1 | | 6/2005 | Bauchot et al. |
| 2005/0288911 A1 | * | 12/2005 | Porikli .............................. 703/2 |
| 2006/0002590 A1 | * | 1/2006 | Borak ........................... 382/104 |
| 2006/0007308 A1 | * | 1/2006 | Ide et al. ........................ 348/143 |
| 2006/0055521 A1 | | 3/2006 | Blanco et al. |
| 2007/0057840 A1 | * | 3/2007 | Thomas et al. ........... 342/357.08 |
| 2008/0122693 A1 | | 5/2008 | Needham et al. |
| 2008/0129599 A1 | * | 6/2008 | Thomas et al. ................ 342/458 |
| 2008/0148931 A1 | * | 6/2008 | Svensson et al. ............ 89/41.05 |
| 2009/0262197 A1 | * | 10/2009 | Nakamura ..................... 348/169 |
| 2009/0310664 A1 | | 12/2009 | Yannone |
| 2010/0172543 A1 | | 7/2010 | Winkler |
| 2010/0207738 A1 | | 8/2010 | Bloy |
| 2010/0219953 A1 | | 9/2010 | Bloy |
| 2011/0012719 A1 | * | 1/2011 | Hilger et al. ................... 340/435 |
| 2011/0026007 A1 | * | 2/2011 | Gammenthaler ............... 356/28 |

OTHER PUBLICATIONS

U.S. Office Action dated Feb. 15, 2012 in U.S. Appl. No. 12/563,414.
U.S. Appl. No. 12/563,414, filed Sep. 21, 2009, Plotke et al.
U.S. Office Action dated Nov. 8, 2012 in U.S. Appl. No. 13/011,354.
U.S. Notice of Allowance dated May 21, 2012 in U.S. Appl. No. 12/563,414.
U.S. Notice of Allowance dated Mar. 26, 2013 in U.S. Appl. No. 13/011,354.

* cited by examiner

*Primary Examiner* — Matthew Bella
*Assistant Examiner* — Jason Heidemann
(74) *Attorney, Agent, or Firm* — Hope Baldauff, LLC (57) ABSTRACT

A method and apparatus for detecting objects. An object detector associated with a platform and configured to detect a number of objects is used to monitor for the number of objects. In response to detecting the number of objects, a number of distances to the number of objects detected by the object detector are measured using a distance measurement system. A number of geographic locations for the number of objects is identified using the number of distances, a location of the platform, and an orientation of the distance measurement system.

19 Claims, 8 Drawing Sheets

OBJECT DETECTION AND LOCATION SYSTEM

BACKGROUND INFORMATION

1. Field

The present disclosure relates generally to detecting objects and, in particular, to detecting and locating moving vehicles. Still more particularly, the present disclosure relates to a method and apparatus for detecting and locating multiple vehicles simultaneously.

2. Background

Detecting and locating objects is a process that is commonly used in many different situations. For example, with respect to traffic, vehicles moving faster than a posted speed limit may be detected. Often times, law enforcement officers and other personnel may use radar systems to determine the speeds of vehicles. If a vehicle is going faster than a posted speed limit, the law enforcement personnel may issue a ticket or citation to the driver of the vehicle. In some cases, automated systems are used to identify and generate tickets for vehicles moving faster than a posted speed limit. These systems employ cameras and/or radar systems to identify the speed of vehicles and to obtain images to identify vehicles for which tickets should be generated.

As another example, with search and rescue operations or border control, personnel detect objects in the form of people. When an object of interest is detected, the location of the object is made and the object also may be tracked as part of the detection process. In many cases, it is desirable to track multiple objects at the same time.

Some systems for tracking objects, such as people, place detection systems at different locations. For example, a detector may include a microphone to detect an acoustic event such as a footstep of a human or movement of a vehicle on the ground. Through the placement of microphones in different locations, the movement of the person or vehicle can be detected or tracked over areas in which the microphones are located.

Other systems involve using cameras to obtain images. These images are analyzed to identify objects of interest. The locations of the objects of interest are identified based on the locations of the cameras. With these types of systems, the cameras are placed in known locations. As a result, when objects of interest are identified, the approximate locations of those objects of interest can be identified.

Although these types of systems are useful, these currently used systems for detecting objects of interest are limited in usefulness. For example, these systems are required to be in a fixed position. If a detection system is moved from one location to another location, the location is then recorded. Otherwise, the location of the object detected cannot be accurately identified. Further, the accuracy of the identification of locations of objects also is an approximate identification. The location is based on the location of the detection systems and not the location of the objects of interest themselves.

Therefore, it would be advantageous to have a method and apparatus that takes into account one or more of the issues discussed above, as well as possibly other issues.

SUMMARY

In one advantageous embodiment, an apparatus comprises a platform and an object detector, a distance measurement system, a location system, an orientation identification system, and a controller associated with the platform. The object detector is configured to detect a number of objects. The distance measurement system is configured to measure a number of distances to the number of objects detected by the object detector. The location system is configured to identify a location of the platform. The orientation identification system is configured to identify an orientation of the distance measurement system. The controller is configured to identify a number of geographic locations for the number of objects using the number of distances, the location of the platform, and the orientation of the distance measurement system.

In another advantageous embodiment, a method is provided for detecting objects. An object detector associated with a platform and configured to detect a number of objects is used to monitor the number of objects. In response to detecting the number of objects, a number of distances to the number of objects detected by the object detector are measured using a distance measurement system. A number of geographic locations for the number of objects is identified using the number of distances, a location of the platform, and an orientation of the distance measurement system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that currently used detection systems are only capable of detecting approximate locations of objects. The detection systems identify the locations of objects as the location of the detection systems.

The different advantageous embodiments recognize and take into account that, in some cases, it may be more desirable to have a more accurate identification of a location of an object. Further, the different advantageous embodiments also recognize and take into account that the location of an object may be desirable with respect to a geographic location. For example, in a search and rescue operation, it may be desirable to identify people using longitude, latitude, and altitude information. In this manner, rescue operations may be more quickly directed to the locations of the people needing assistance.

The different advantageous embodiments also recognize and take into account that it may be desirable to have a detection system that is capable of detecting and tracking objects in a platform that moves. For example, the different advantageous embodiments recognize and take into account that it may be desirable to have a camera system that can be used in a ground vehicle, a helicopter, an unmanned aerial vehicle, or some other platform that may move.

Thus, the different advantageous embodiments provide a method and apparatus for detecting objects. The detection of objects may include tracking the objects after they have been identified as being present.

In one advantageous embodiment, an apparatus may comprise a platform, an object detection system, a distance measurement system, an orientation identification system, and a controller. The object detection system is configured to detect a number of objects. The distance measurement system is configured to measure a number of distances to the number of objects detected by the object detection system. The location system is configured to identify the location of platform. The orientation identification system is configured to identify an orientation of the distance measurement system. The controller is configured to identify a number of geographic locations for the number of objects using the number of distances, the location of the platform, and the orientation of the distance measurement system.

Figure 1:
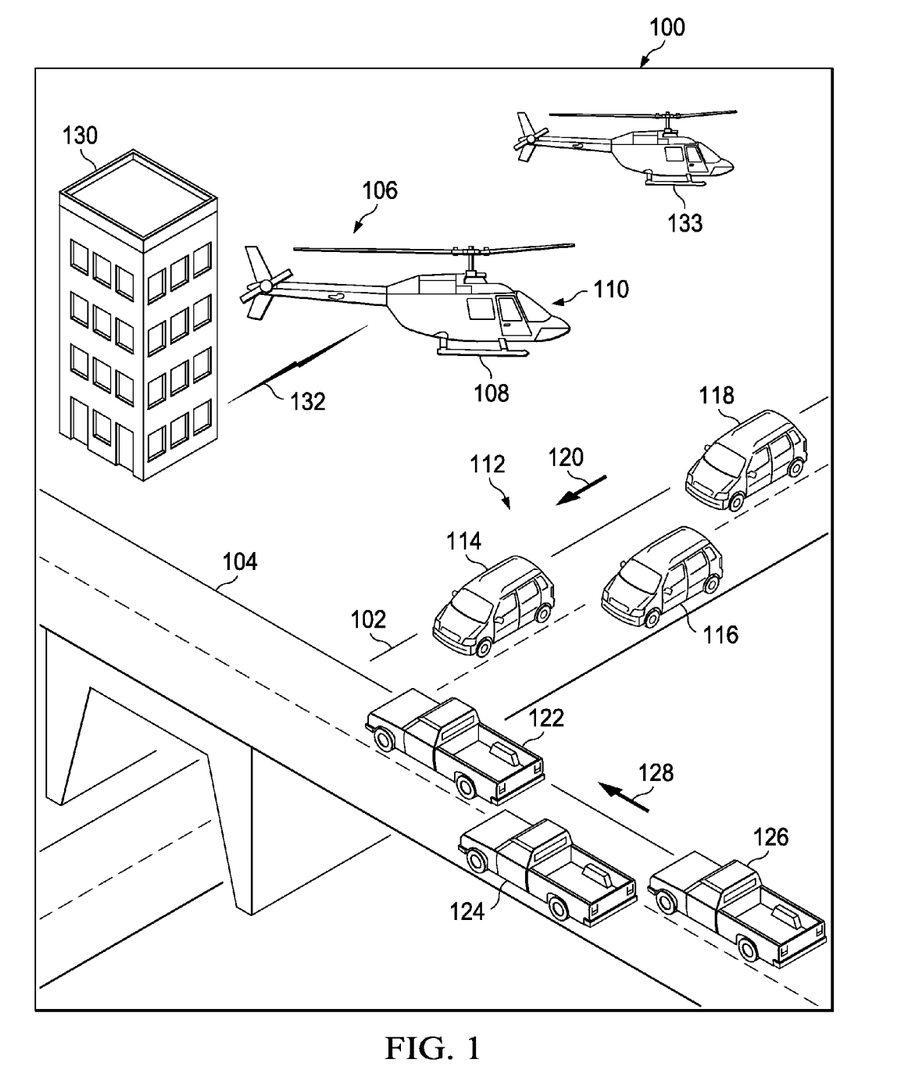
FIG. 1 is an illustration of an object detection environment in accordance with an advantageous embodiment.

Turning now to FIG. 1, an illustration of an object detection environment is depicted in accordance with an advantageous embodiment. In this illustrative example, object detection environment 100 includes road 102, and road 104. In this illustrative example, object detection system 106 is associated with helicopter 108. In this example, helicopter 108 is hovering in position 110.

As depicted, oncoming traffic 112 includes vehicle 114, vehicle 116, and vehicle 118. In this illustrative example, these vehicles are traveling in the direction of arrow 120. Additionally, vehicle 122, vehicle 124, and vehicle 126 are traveling on road 104 in the direction of arrow 128. Object detection system 106 is configured to detect vehicles 114, 116, 118, 122, 124, and 126 as they travel on road 104 and road 102.

Object detection system 106 is configured to identify a geographic location of these vehicles. In other words, object detection system 106 is configured to identify the location of these vehicles with respect to a particular position on the earth. For example, object detection system 106 is capable of identifying the latitude, longitude, and altitude of vehicles 114, 116, 118, 122, 124, and 126.

This information may be sent to remote location 130 for further processing over wireless communications link 132. Remote location 130 may be, for example, without limitation, a law enforcement agency, a third party contractor, transportation authority, or some other suitable location or organization. In these illustrative examples, helicopter 108 may move from position 110 to different positions to detect these and other objects. Even with the movement of helicopter 108, object detection system 106 is configured to identify a geographic location of the different vehicles.

Further, object detection system 106 also may be used to identify objects that may be traveling in the air, rather than on the ground, such as helicopter 133. In addition, object detection system 106 also may be used to identify geographic locations for stationary objects, such as remote location 130.

The illustration of object detection environment 100 in FIG. 1 is not meant to imply physical or architectural limitations to the manner in which different advantageous embodiments may be implemented. This illustration is presented to provide one manner in which an object detection system may be implemented.

Figure 2:
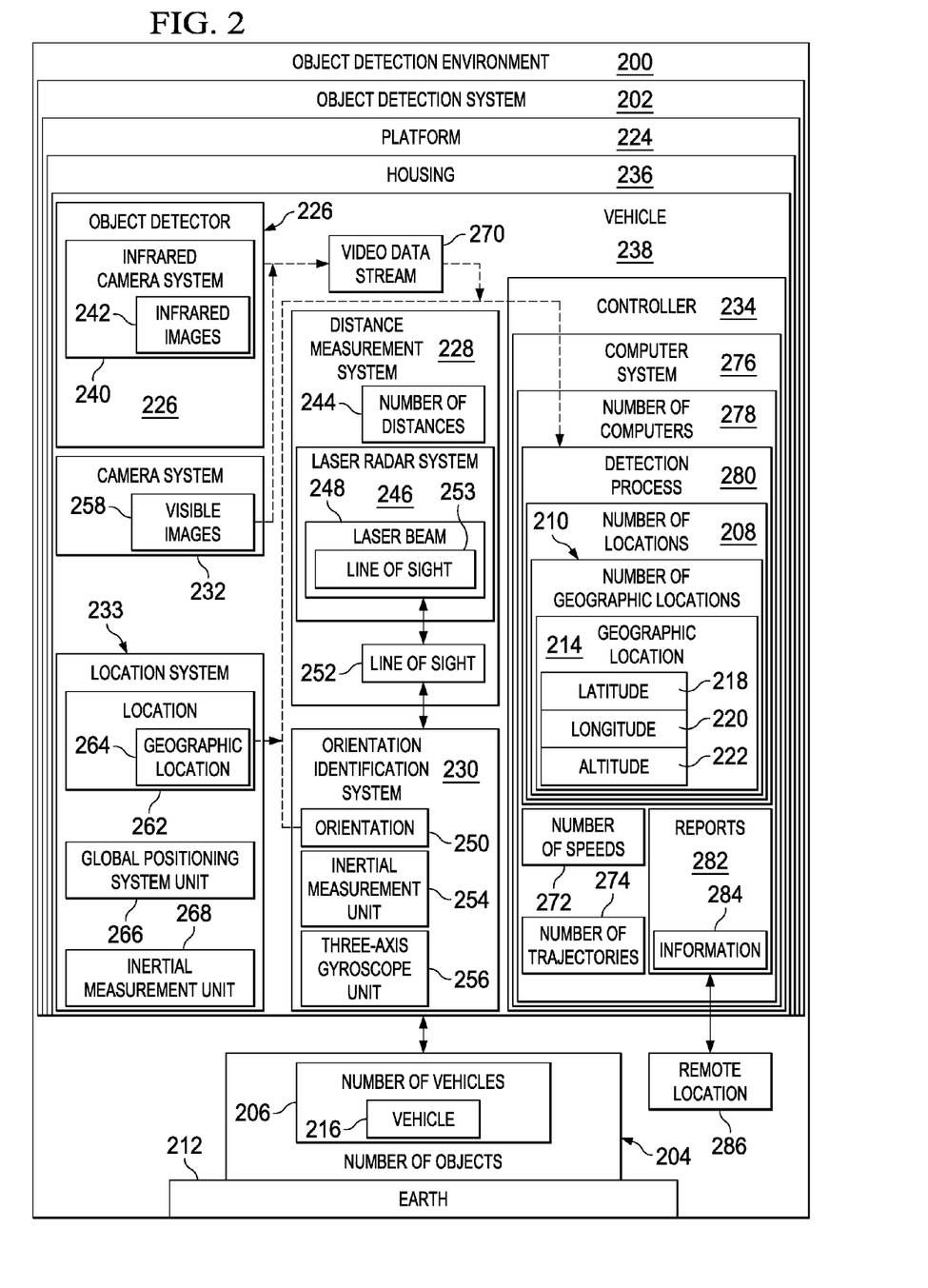
FIG. 2 is an illustration of an object detection environment in accordance with an advantageous embodiment.

With reference now to FIG. 2, an illustration of an object detection environment is depicted in accordance with an advantageous embodiment. Object detection environment 100 in FIG. 1 is an example of one implementation for object detection environment 200 in FIG. 2.

In this illustrative example, object detection system 202 is used to detect number of objects 204. In these illustrative examples, number of objects 204 takes the form of number of vehicles 206. Object detection system 202 detects each of number of vehicles 206 at substantially the same time. In particular, object detection system 202 identifies number of locations 208 for number of vehicles 206.

In these illustrative examples, number of locations 208 is number of geographic locations 210 for number of objects 204 on earth 212. For example, object detection system 202 identifies geographic location 214 in number of geographic locations 210 for vehicle 216 on earth 212.

Geographic location 214 comprises latitude 218, longitude 220, and altitude 222. Of course, any reference system or coordinate system may be used to identify geographic location 214 of vehicle 216. For example, a Cartesian coordinate system, a stereographic coordinate system, or some other suitable type of coordinate system may be used to identify geographic location 214 of vehicle 216.

In this illustrative example, object detection system 202 includes platform 224, object detector 226, distance measurement system 228, orientation identification system 230, camera system 232, location system 233, and controller 234. Object detector 226, distance measurement system 228, orientation identification system 230, camera system 232, and controller 234 are associated with platform 224 in these examples.

Platform 224 may take a number of different forms. For example, platform 224 may be housing 236. Housing 236 may be associated or connected to another platform, such as a vehicle or building. A first component, such as housing 236, may be considered to be associated with a second component, such as another platform, by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

In other illustrative examples, platform 224 may be vehicle 238. For example, vehicle 238 may be a helicopter, an airplane, a truck, a car, or some other suitable type of vehicle. With this type of implementation, object detector 226, distance measurement system 228, orientation identification system 230, camera system 232, and controller 234 may be integrated as part of vehicle 238.

In these illustrative examples, object detector 226 is configured to detect number of objects 204. Object detector 226 may take the form of infrared camera system 240. Infrared camera system 240 generates infrared images 242. Infrared images 242 show heat detected by infrared camera system 240.

Distance measurement system 228 is configured to measure number of distances 244 to number of objects 204. In other words, distance measurement system 228 measures the distance from object detection system 202 to each of number of objects 204. In these illustrative examples, distance measurement system 228 may take a number of different forms. For example, distance measurement system 228 may be laser radar system 246.

Laser radar system 246 may have a wavelength that is detectable by infrared camera system 240 in these examples. In other words, laser radar system 246 may be detected in infrared images 242. For example, laser radar system 246 may generate laser beam 248. Laser beam 248 may project light on number of objects 204 that is detectable by infrared camera system 240 in these illustrative examples. In other words, this light may be detected in infrared images 242. Further, depending on the location of where this light is detected in infrared images 242, the direction in which laser beam 248 is pointed may be adjusted.

Orientation identification system 230 is configured to identify orientation 250 of object detection system 202. Orientation 250 may include for example, without limitation, a pitch, a roll, and a yaw for object detection system 202 with respect to axis 251. Axis 251 is an axis through object detection system 202 and the center of the Earth. In some cases, orientation 250 may include an attitude for object detection system 202.

Orientation 250 may be used to identify line of sight 252 for object detection system 202. Line of sight 252 is the line through the direction in which the object detection system 202 is pointed. Further, laser radar system 246 may identify line of sight 253 for laser beam 248 with respect to line of sight 252 for object detection system 202.

In these illustrative examples, orientation identification system 230 may take a number of different forms. For example, orientation identification system 230 may take the form of inertial measurement unit 254, three-axis gyroscope unit 256, or other suitable types of systems that provide orientation 250. For example, orientation identification system 230 may include a compass.

Camera system 232 generates visible images 258 of number of objects 204. Visible images 258 are images that represent what is seen by a person in these illustrative examples. These images may be used for further analysis of number of objects 204.

Location system 233 is configured to provide location 262 of platform 224. In these examples, location 262 takes the form of geographic location 264. Location system 233 may be implemented in a number of different ways. For example, location system 233 may take the form of global positioning system unit 266, inertial measurement unit 268, or some other suitable system that is capable of providing location 262 for platform 224.

Controller 234 is configured to detect number of objects 204. In these illustrative examples, infrared images 242 and visible images 258 are sent in video data stream 270. With respect to number of objects 204 that are detected using video data stream 270, controller 234 is configured to identify number of geographic locations 210 using number of distances 244, location 262 of platform 224, and orientation 250 of distance measurement system 228.

Additionally, controller 234 also may be configured to identify at least one of number of speeds 272 for number of objects 204, number of trajectories 274 for number of objects 204 and other desired information with respect to number of objects 204.

In these illustrative examples, controller 234 may take a number of different forms. For example, controller 234 may be computer system 276. Computer system 276 may be comprised of number of computers 278. In these illustrative examples, detection process 280 runs on controller 234 to cause controller 234 to perform the different operations for detecting number of objects 204. In these illustrative examples, controller 234 may generate reports 282. These reports contain information 284 about number of objects 204. Reports 282 may be sent to remote location 286 for further processing.

The illustration of FIG. 2 is not meant to imply physical or architectural limitations to the manner in which different advantageous embodiments may be implemented. Other components in addition to or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, number of objects 204 may not be vehicles. Number of objects 204 may include any object capable of having an infrared signature. An object may be capable of having an infrared signature by having a temperature that is different than a temperature of the ambient environment around the object. For example, number of objects 204 may include a stationary object, a moving object, a vehicle, a person, an aircraft, an unmanned aerial vehicle, a satellite, a surface ship, a tank, a missile, a building, a dam, an animal, a fire, and an explosion.

In some illustrative examples, geographic location 264 may be implemented using other coordinate systems other than latitude, longitude, and altitude. For example, polar coordinates with elevation may be used. In still other illustrative examples, the coordinate system may be any coordinate system that relates an object to other objects. For example, the coordinate system may be a reference point with respect to a ship. The coordinates may identify locations of people and/or other objects on or around the ship. In still other illustrative examples, the coordinate system may be used to identify the locations of objects relative to a moon or a planet.

Additionally, in other illustrative examples, platform 224 may take the form of a stationary or mobile platform. For example, platform 224 may be a pole, building, bridge, dam, or some other suitable type of structure onto which object detection system 202 may be mounted. Further, in still other illustrative examples, object detection system 202 may include a platform with a two-axis gimbal mechanism that allows object detector 226 to rotate over 4 pi steradians.

Figure 3:
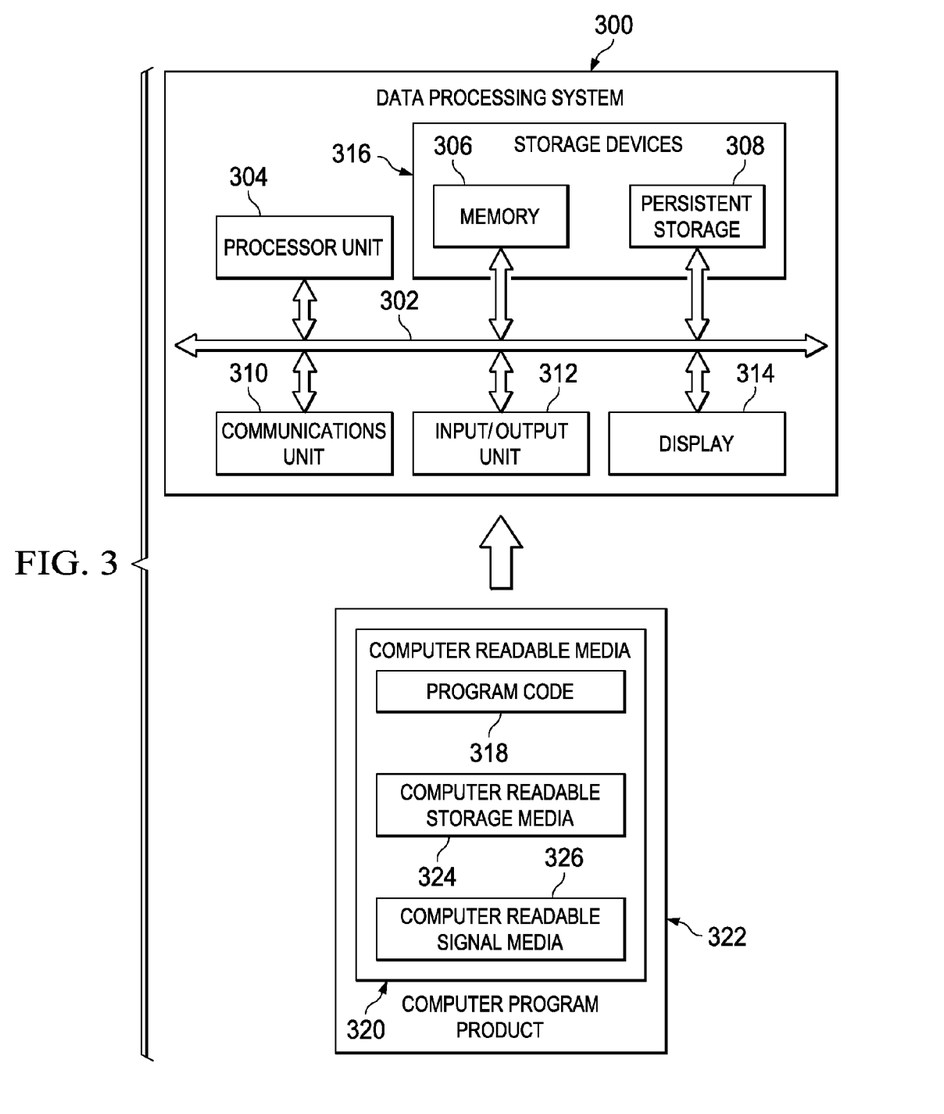
FIG. 3 is an illustration of a data processing system in accordance with an advantageous embodiment.

Turning now to FIG. 3, an illustration of a data processing system is depicted in accordance with an advantageous embodiment. Data processing system 300 in FIG. 3 is an example of a data processing system that may be used to implement one or more computers in computer system 276. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326.

Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300. In some instances, computer readable storage media 324 may not be removable from data processing system 300. In these illustrative examples, computer readable storage media 324 is a non-transitory computer readable storage medium.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 304 may take the form of a hardware unit that has circuits that are manufactured or configured for a particular use. This type of hardware may perform operations without needing program code to be loaded into a memory from a storage device to be configured to perform the operations.

For example, when processor unit 304 takes the form of a hardware unit, processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 318 may be omitted because the processes for the different embodiments are implemented in a hardware unit.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

Figure 4:
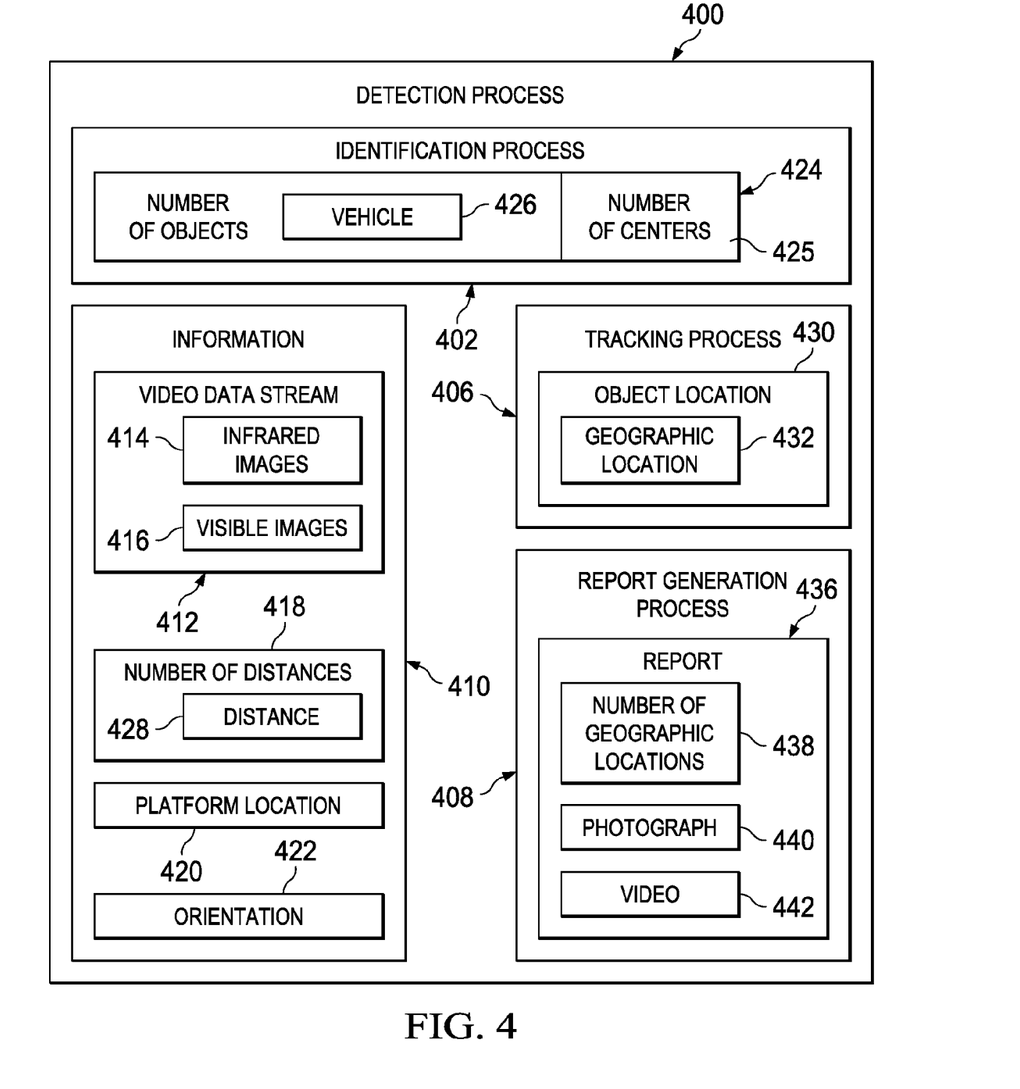
FIG. 4 is an illustration of a detection process in accordance with an advantageous embodiment.

With reference now to FIG. 4, an illustration of a detection process is depicted in accordance with an advantageous embodiment. In this illustrative example, detection process 400 is an example of one implementation for detection process 280 in FIG. 2. In this illustrative example, detection process 400 includes a number of different processes. For example, detection process 400 includes identification process 402, tracking process 406, and report generation process 408.

Detection process 400 receives information 410. In these depicted examples, information 410 includes video data stream 412 which has infrared images 414 and visible images 416. Information 410 also includes number of distances 418, platform location 420, and orientation 422.

Identification process 402 uses infrared images 414 to detect number of objects 424. In these examples, number of objects 424 includes vehicle 426. Further, infrared images 414 may be used by identification process 402 to identify number of centers 425 for number of objects 424 in infrared images 414. In some cases, number of centers 425 for number of objects 424 may be referred to as a number of centroids.

Additionally, infrared images 414 are used by tracking process 406 to track vehicle 426 in number of objects 424. In these examples, infrared images 414 also may be used to direct a distance measurement system, such as distance measurement system 228 in FIG. 2, to generate a measurement of number of distances 418 for number of objects 424. Number of distances 418 includes a measure of the distance from the platform in which detection process 400 is located to the center in number of centers 425 for each object in number of objects 424 detected by detection process 400. For example, distance 428 in number of distances 418 is a measurement of the distance between the platform in which detection process 400 is located and vehicle 426.

In this illustrative example, platform location 420 is the location of the platform in which detection process 400 is located. Platform location 420 may be generated by, for example, location system 233 in FIG. 2. Orientation 422 is the orientation of the distance measurement system associated with the platform in which detection process 400 is located. Orientation 422 may be generated by, for example, orientation identification system 230 in FIG. 2.

Tracking process 406 identifies object location 430 of vehicle 426 using distance 428, platform location 420, and orientation 422. In these illustrative examples, object location 430 is geographic location 432 for vehicle 426. Geographic location 432 includes a latitude, longitude, and altitude for vehicle 426. In other illustrative examples, geographic location 432 may use a different coordinate system, such as a Cartesian coordinate system, a stereographic coordinate system, or a polar coordinate system with an elevation.

Further, in these depicted examples, tracking process 406 may use infrared images 414 to detect the distance measurement system in infrared images 414. For example, when the distance measurement system is a laser radar system, tracking process 406 may detect the light projected onto vehicle 426 in infrared images 414 from the laser beam generated by the laser radar system.

Detection of the distance measurement system in infrared images 414 may be used to guide a movement of the distance measurement system. For example, tracking process 406 may determine that the light from the laser beam detected in infrared images 414 is not on vehicle 426. Detection process 400 may send commands to the distance measurement system to guide movement of the distance measurement system such that the laser beam is directed onto vehicle 426.

In these illustrative examples, report generation process 408 generates report 436. Report 436 includes number of geographic locations 438 for each of number of objects 424 that are identified by identification process 402. Number of geographic locations 438 is the number of geographic locations identified for number of objects 424 by tracking process 406. In this manner, tracking process 406 tracks number of objects 424.

As one illustrative example, report 436 includes geographic location 432 for vehicle 426 identified by identification process 402 and tracked by tracking process 406. Additionally, report 436 also may include photograph 440 and video 442 of number of objects 424.

Photograph 440 may be processed to include portions of desired information. For example, if detection process 400 is used in a speed enforcement implementation, the photograph may be cropped to include only a vehicle that has been identified as exceeding a speed threshold.

In yet other illustrative examples, adjustments may be made to a visible image in visible images 416 to identify vehicle 426 in at least one of photograph 440 and video 442. Vehicle 426 may be identified in photograph 440 and/or video 442 using a marker. This marker may be, for example, without limitation, an illumination of a pixel in a photograph, a text label, a tag, a symbol, and/or some other suitable type of marker. When appropriate, report 436 may be sent to a remote location for processing.

Figure 5:
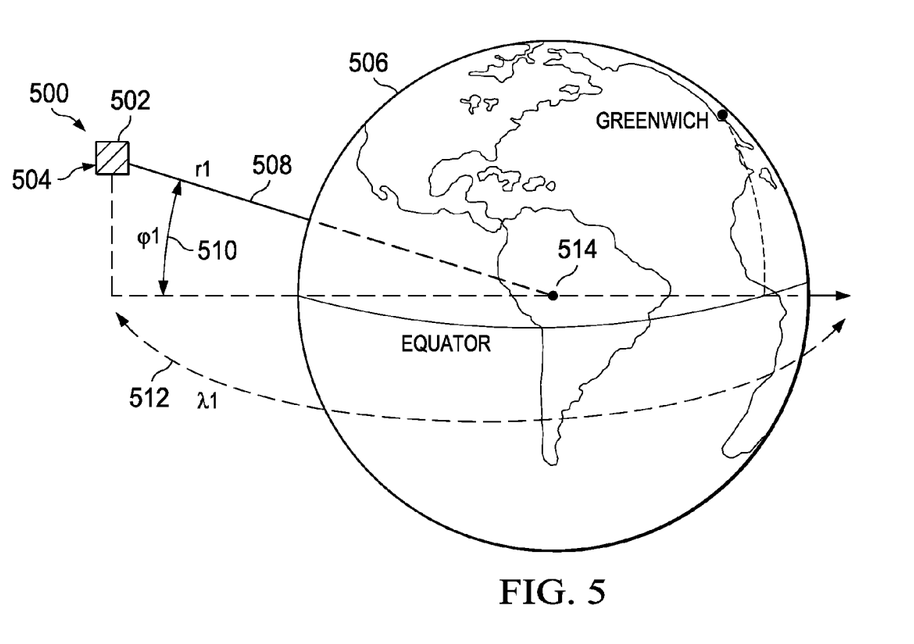
FIG. 5 is an illustration of an object detection system in accordance with an advantageous embodiment.

With reference now to FIG. 5, an illustration of an object detection system is depicted in accordance with an advantageous embodiment. In this illustrative example, object detection system 500 is an example of one implementation for object detection system 202 in FIG. 2. Object detection system 500 is associated with platform 502 in this example. Platform 502 may be an aircraft, an unmanned aerial vehicle, a spacecraft, a space station, a satellite, or some other suitable type of platform in this example.

As depicted, platform 502 has location 504 above Earth 506. Location 504 may be identified using, for example, location system 233 in FIG. 2. In this illustrative example, location 504 includes distance 508, latitudinal location 510, and longitudinal location 512 for platform 502 and object detection system 500.

Distance 508 is the distance from center 514 of Earth 506 to object detection system 500 and platform 502. Latitudinal location 510 is the location of object detection system 500 in degrees latitude. Longitudinal location 512 is the location of object detection system 500 in degrees longitude.

In this illustrative example, object detection system 500 has a line of sight that is pointed at center 514 of Earth 506. Of course in other illustrative examples, the line of sight for object detection system 500 may be offset from an axis going through object detection system 500 and center 514 of Earth 506.

Figure 6:
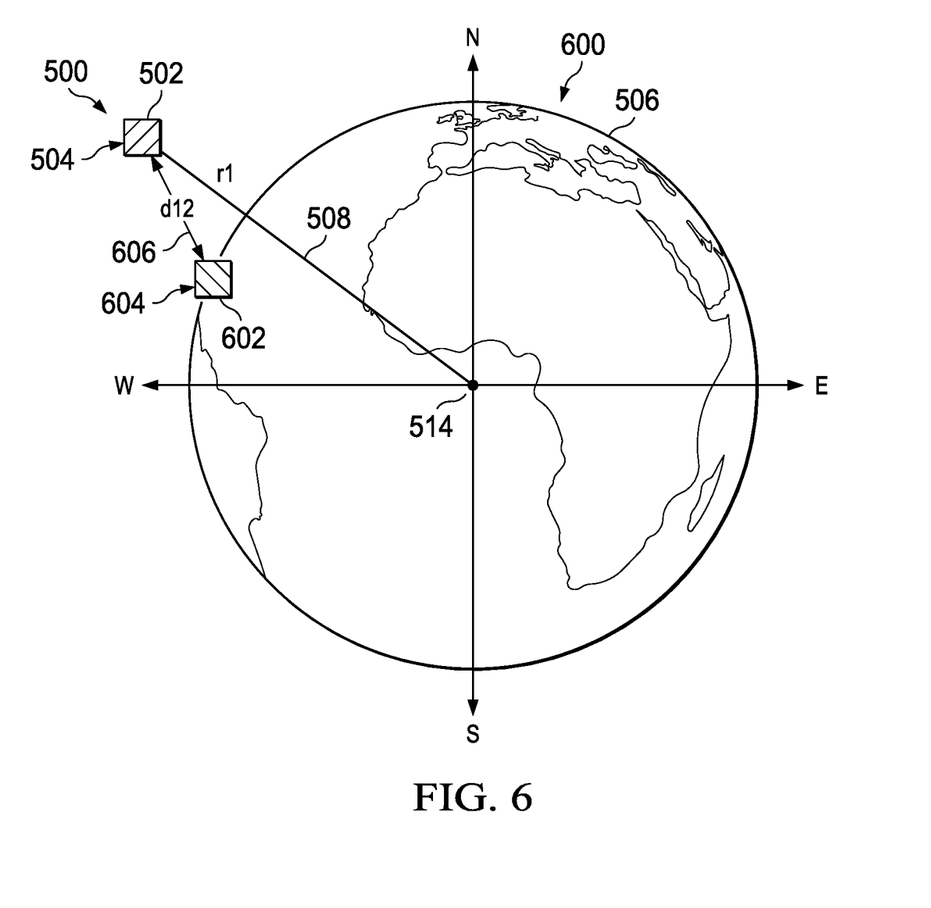
FIG. 6 is an illustration of an object detection environment in accordance with an advantageous embodiment.

With reference now to FIG. 6, an illustration of an object detection environment is depicted in accordance with an advantageous embodiment. In this illustrative example, object detection environment 600 is an example of one implementation for object detection environment 200 in FIG. 2. Object detection environment 600 includes object detection system 500 from FIG. 5 and object 602.

As depicted, object detection system 500 associated with platform 502 has location 504 above Earth 506. Location 504 includes distance 508, latitudinal location 510, and longitudinal location 512 in FIG. 5. Distance 508 may be seen in this illustrative example. Latitudinal location 510 and longitudinal location 512 may not be shown in this figure.

In this illustrative example, object 602 has location 604 on Earth 506. Distance 606 is the distance between object 602 and object detection system 500.

Figure 7:
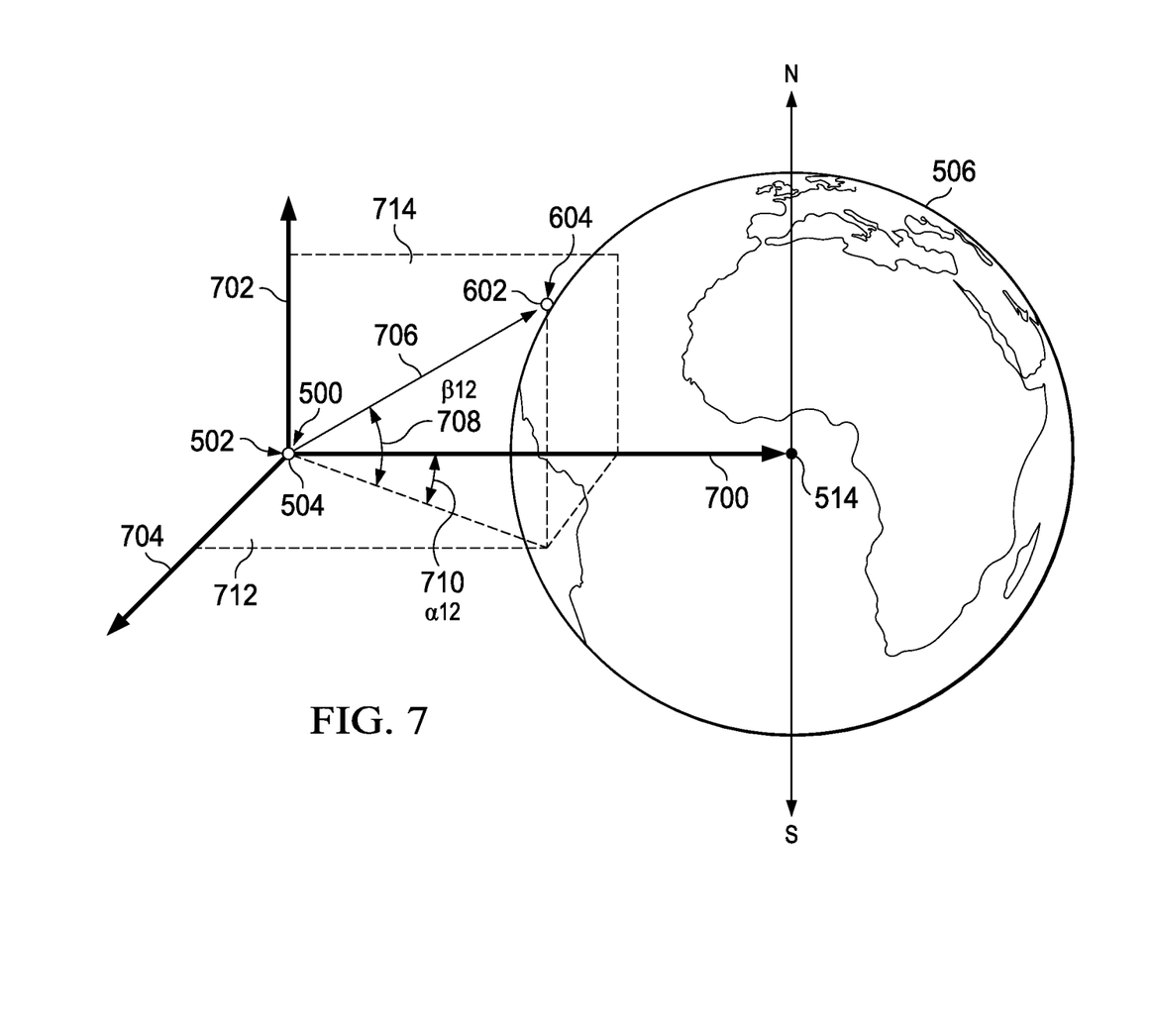
FIG. 7 is an illustration of an object detection environment in accordance with an advantageous embodiment.

With reference now to FIG. 7, an illustration of an object detection environment is depicted in accordance with an advantageous embodiment. In this illustrative example, object detection environment 600 is depicted from a different perspective view as compared to the view for object detection environment 600 depicted in FIG. 6.

Location 504 of object detection system 500 and platform 502 is a location above Earth 506 in this example. Object 602 is in location 604 on Earth 506. As depicted, axis 700 is an axis through location 504 of object detection system 500 and through center 514 of Earth 506. Axis 702 is an axis parallel to the lines of longitude and pointing North in this illustrative example. Axis 704 is an axis parallel to the lines of latitude and pointed East in this illustrative example.

As depicted, object detection system 500 has line of sight 706 pointed towards object 602. Object detection system 500 is configured to measure elevation angle 708 and azimuth angle 710. Elevation angle 708 is measured with respect to line of sight 706 and plane 712 formed by axis 700 and axis 704. Azimuth angle 710 is measured with respect to line of sight 706 and plane 714 formed by axis 700 and axis 702.

In the different advantageous embodiments, a tracking process, such as tracking process 406 in FIG. 4 may be used to identify location 604 of object 602. For example, distance 508 in FIG. 5 of object detection system 500 associated with platform 502 may be about 1.071 kilometers above sea level. Distance 508 is r1. Sea level is about 6378.1 kilometers such that distance 508, r1, is about 6379.171 kilometers. Latitudinal location 510 in FIG. 5 is about 34.05222 degrees North latitude. Latitudinal location 510 is $\phi 1$. Longitudinal location 512 in FIG. 5 is about $-118.24278$ degrees West longitude. Longitudinal location 512 is $\lambda 1$.

Object detection system 500 may be configured to use the values for distance 508, latitudinal location 510, and longitudinal location 512, distance 606, elevation angle 708, and azimuth angle 710 to identify location 604 of object 602. Distance 606, elevation angle 708, and azimuth angle 710 are identified as follows:

d12=10.072 kilometers,
β12=73.925 degrees, and
α12=83.852 degrees, where d12 is distance 606, β12 is elevation angle 708, and α12 is azimuth angle 712. Distance 606 may be measured using a distance measurement system, such as distance measurement system 228 in FIG. 2.

These values may be used to perform the following calculations:

$$x\_1 = r1 = 6.379 \times 10^3 \cdot \text{km}$$

$$y\_1 = 0 \cdot m$$

$$z\_1 = 0 \cdot m$$

$$z\_2 = \sqrt{\frac{d12^2 \cdot \tan(\beta 12)^2}{(1 + \tan(\alpha 12)^2 + \tan(\beta 12)^2)}} \cdot$$
$$\text{if } (\beta 12 < 0 \cdot \text{deg}, -1, 1) = 3.509 \cdot \text{km}$$

$$x\_2 = x\_1 - \left|\frac{z\_2}{\tan(\beta 12)}\right| \cdot$$
$$\text{if } (|\alpha 12| > 90 \cdot \text{deg}, -1, 1) = 6.378 \times 10^3 \cdot \text{km}$$

$$y\_2 = -\left(\left|\frac{z\_2 \cdot \tan(\alpha 12)}{\tan(\beta 12)}\right| \text{ if } (\alpha 12 < 0 \cdot \text{deg}, -1, 1)\right) = -9.387 \cdot \text{km}$$

$$r\_2 = \sqrt{x\_2^2 + z\_2^2} = 6.378 \times 10^3 \cdot \text{km}$$

$$\phi 2 = \phi 1 + \text{atan}\left(\frac{z\_2}{x\_2}\right) = 34.084 \cdot \text{deg}$$

$$yy\_2 = y\_2 = -9.387 \cdot \text{km}$$

$$xx\_2 = r\_2 \cdot \cos(\phi 2) = 5.283 \times 10^3 \cdot \text{km}$$

$$zz\_2 = r\_2 \cdot \sin(\phi 2) = 3.574 \times 10^3 \cdot \text{km}$$

$$rr\_2 = \sqrt{xx\_2^2 yy\_2^2} = 5.283 \times 10^3 \cdot \text{km}$$

$$\lambda 2 = \lambda 1 + \text{atan}\left(\frac{yy\_2}{xx\_2}\right) = -118.345 \text{ deg}$$

$$x2 = rr\_2 \cdot \cos(\lambda 2) = -2.508 \times 10^3 \cdot \text{km}$$

$$y2 = rr\_2 \cdot \sin(\lambda 2) = -4.649 \times 10^3 \cdot \text{km}$$

$$z2 = zz\_2 = 3.574 \times 10^3 \cdot \text{km}$$

$$r2 = \sqrt{x2^2 + y2^2 + z2^2} = 6.378 \times 10^3 \cdot \text{km}$$

$$\phi 2 = \text{asin}\left(\frac{z2}{r2}\right) = 34.084 \cdot \text{deg}.$$

Using the above calculations, the location of object 602 may be identified as follows:
r2=6.378×10³ kilometers,
$\phi 2$=34.084 degrees, and
$\lambda 2$=−118.345 degrees, where r2 is the distance from object 602 to center 514 of Earth 506, φ2 is location 604 of object 602 in latitude, and λ2 is location 604 of object 602 in longitude.

Figure 8:
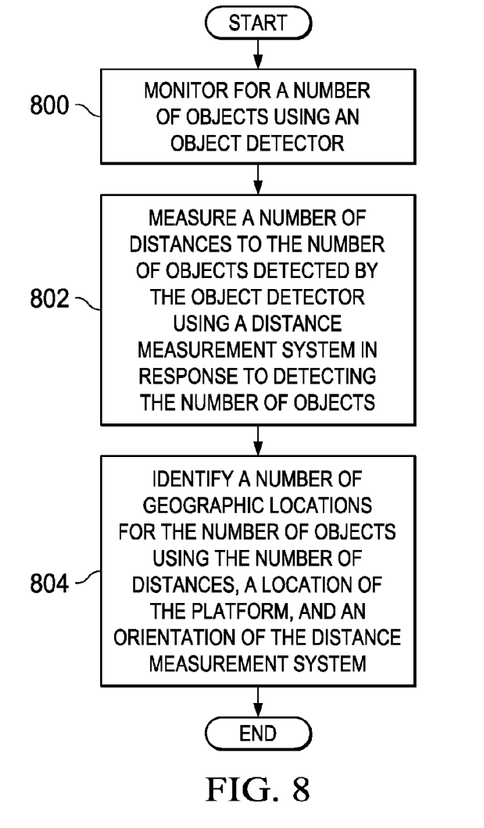
FIG. 8 is an illustration of a flowchart of a process for detecting objects in accordance with an advantageous embodiment.

With reference now to FIG. 8, an illustration of a flowchart of a process for detecting objects is depicted in accordance with an advantageous embodiment. The process illustrated in FIG. 8 may be implemented using object detection system 202 in FIG. 2.

The process begins by monitoring for a number of objects using an object detector (operation 800). The object detector is configured to detect a number of objects. For example, the object detector may be an infrared camera system, such as infrared camera system 240 in FIG. 2, configured to generate infrared images in which objects may be detected.

Further, the object detector is associated with a platform. The platform may be selected from one of a housing, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, or some other suitable type of platform.

Thereafter, the process measures a number of distances to the number of objects detected by the object detector using a distance measurement system in response to detecting the number of objects (operation 802). The distance measurement system may be a laser radar system, such as laser radar system 246 in FIG. 2.

Next, the process identifies a number of geographic locations for the number of objects using the number of distances, a location of the platform, and an orientation of the distance measurement system (operation 804), with the process terminating thereafter. The geographic locations may include a latitude, a longitude, and an altitude for the number of objects.

Figure 9:
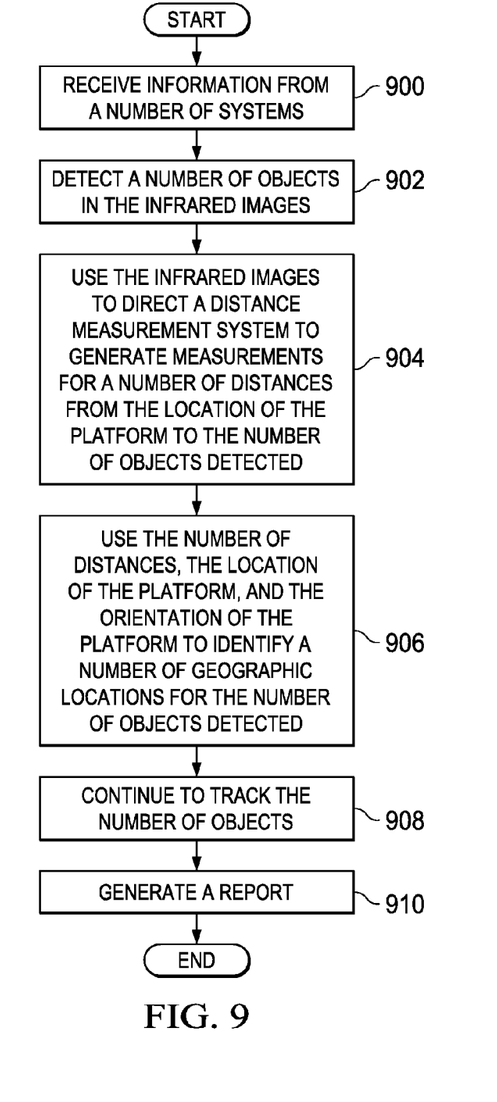
FIG. 9 is an illustration of a flowchart of a process for detecting objects in accordance with an advantageous embodiment.

With reference now to FIG. 9, an illustration of a flowchart of a process for detecting objects is depicted in accordance with an advantageous embodiment. The process illustrated in FIG. 9 may be implemented using detection process 400 in FIG. 4.

The process begins by receiving information from a number of systems (operation 900). The number of systems may include an object detector, a camera system, and an orientation identification system. The information received includes a video data stream, a location of the platform on which the detection process is located, and an orientation of the platform on which the detection process is located. The video data stream includes infrared images and visible images.

The process then detects a number of objects in the infrared images (operation 902). Next, the process uses the infrared images to direct a distance measurement system to generate measurements for a number of distances from the location of the platform to the number of objects detected (operation 904). Thereafter, the process uses the number of distances, the location of the platform, and the orientation of the platform to identify a number of geographic locations for the number of objects detected (operation 906). The process then continues to track the number of objects (operation 908).

Thereafter, the process generates a report (operation 910), with the process terminating thereafter. The report may be generated while the detection process tracks the number of objects as the number of objects move and/or the platform on which the detection process is located moves. In other illustrative examples, the report may be generated once the number of objects can no longer be detected in the infrared images received.

The report may include the number of geographical locations. Further, the report may also include a photograph and/or video. In some illustrative examples, the number of objects may be identified in the photograph and/or video using a marker.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for detecting objects. The detection of objects may include tracking the objects after they have been identified as being present.

In one advantageous embodiment, an apparatus may comprise a platform, an object detection system, a distance measurement system, an orientation identification system, and a controller. The object detection system is configured to detect a number of objects. The distance measurement system is configured to measure a number of distances to the number of objects detected by the object detection system. The location system is configured to identify the location of the platform. The orientation identification system is configured to identify an orientation of the distance measurement system. The controller is configured to identify a number of geographic locations for the number of objects using the number of distances, the location of the platform, and the orientation of the distance measurement system.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Modems and network adapters are just a few non-limiting examples of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a platform;
    an object detector associated with the platform and configured to detect a number of objects;
    a distance measurement system associated with the platform and configured to measure a number of distances to the number of objects detected by the object detector;
    a location system associated with the platform and configured to identify a location of the platform;
    an orientation identification system associated with the platform and configured to identify an orientation of the distance measurement system; and
    a controller associated with the platform and configured to identify a number of geographic locations for the number of objects using the number of distances, the location of the platform, and the orientation of the distance measurement system,
    wherein the controller is configured to identify a center for each object in the number of objects to form a number of centers and direct the distance measurement system to measure the number of distances to the number of centers for the number of objects,
    wherein the geographic location for each object is identified based on the controller measuring
        an elevation angle measured with respect to a line of sight between the location of the platform and each object and a first plane formed by a first axis defined through the location of the platform and the center of the earth, and a second axis orthogonal to the first axis and being parallel to a line of latitude, and
        an azimuth angle measured with respect to the line of sight between the location of the platform and a second plane formed by the first axis and a third axis orthogonal to the first axis and being parallel to a line of longitude.

2. The apparatus of claim 1 further comprising:
    a camera system configured to generate images of the number of objects that are visible to a person.

3. The apparatus of claim 1, wherein the controller is configured to identify a number of speeds for the number of objects and a number of trajectories for the number of objects.

4. The apparatus of claim 1, wherein the object detector is configured to track the number of objects.

5. The apparatus of claim 1, wherein the object detector is configured to generate an image with the number of objects and the controller is configured to identify the number of objects from the image.

6. The apparatus of claim 1, wherein the controller is configured to generate the number of geographic locations for the number of objects using the number of distances to the number of objects, the location of the platform, and a number of lines of sight to the number of objects.

7. The apparatus of claim 6, wherein the number of lines of sight is identified using the orientation of the distance measurement unit.

8. The apparatus of claim 1, wherein the object detector comprises:
    an infrared camera system.

9. The apparatus of claim 1, wherein the distance measurement system comprises:
    a laser radar system.

10. The apparatus of claim 1, wherein the orientation identification system comprises at least one of an inertial measurement unit, a compass, and a gyroscope.

11. The apparatus of claim 1, wherein the location system comprises at least one of a global positioning system unit and an inertial measurement unit.

12. The apparatus of claim 1, wherein the platform is selected from one of a housing, a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

13. The apparatus of claim 1, wherein an object in the number of objects is selected from one of a stationary object, a moving object, a vehicle, a person, an aircraft, a satellite, a surface ship, a tank, a missile, a building, a dam, an animal, a fire, and an explosion.

14. The apparatus of claim 1, wherein the controller is selected from one of a processor unit and a computer system.

15. The apparatus of claim 1, wherein the location of the platform being calculated by the location system based on a distance from the center of the earth to the platform, a latitudinal location of the platform in degrees latitude, and a longitudinal location of the platform in degrees longitude.

16. A method for detecting objects, the method comprising:
    monitoring for a number of objects using an object detector associated with a platform and configured to detect the number of objects;

responsive to detecting the number of objects, measuring a number of distances to the number of objects detected by the object detector using a distance measurement system;

identifying a number of geographic locations for the number of objects using the number of distances, a location of the platform, and an orientation of the distance measurement system, wherein the geographic location for each object is identified based on measuring
- an elevation angle measured with respect to a line of sight between the location of the platform and each object and a first plane formed by a first axis defined through the location of the platform and the center of the earth, and a second axis orthogonal to the first axis and being parallel to a line of latitude, and
- an azimuth angle measured with respect to the line of sight between the location of the platform and a second plane formed by the first axis and a third axis orthogonal to the first axis and being parallel to a line of longitude; and identifying a number of speeds for the number of objects and a number of trajectories for the number of objects.

17. The method of claim 16 further comprising:

identifying the location of the platform.

18. The method of claim 16 further comprising:

identifying the orientation of the distance measurement system.

19. The method of claim 16 further comprising:

determining the location of the platform based on a distance from the center of the earth to the platform, a latitudinal location of the platform in degrees latitude, and a longitudinal location of the platform in degrees longitude.

* * * * *